United States Patent
Krichevsky et al.

(10) Patent No.: US 12,052,058 B2
(45) Date of Patent: Jul. 30, 2024

(54) OPTICAL TRANSCEIVER INTEGRATED CIRCUIT

(71) Applicant: Intel Corporation, Santa Clara, CA (US)

(72) Inventors: Alexander Krichevsky, Cupertino, CA (US); Boping Xie, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 17/075,372

(22) Filed: Oct. 20, 2020

(65) Prior Publication Data

US 2021/0058159 A1  Feb. 25, 2021

(51) Int. Cl.
*H04B 10/40* (2013.01)
*H04B 10/079* (2013.01)
*H04B 10/516* (2013.01)

(52) U.S. Cl.
CPC ......... *H04B 10/40* (2013.01); *H04B 10/0795* (2013.01); *H04B 10/5161* (2013.01)

(58) Field of Classification Search
CPC . H04B 10/40; H04B 10/0795; H04B 10/5161
See application file for complete search history.

(56) References Cited

U.S. PATENT DOCUMENTS

| | | | |
|---|---|---|---|
| 6,697,550 B2* | 2/2004 | Chen | G02F 1/093 385/11 |
| 7,440,648 B2 | 10/2008 | Oikawa et al. | |
| 2004/0258415 A1* | 12/2004 | Boone | H04B 10/1125 398/125 |
| 2016/0274305 A1* | 9/2016 | Ye | H04B 10/503 |
| 2018/0314006 A1* | 11/2018 | Tang | G02B 6/29313 |
| 2021/0351555 A1* | 11/2021 | Chen | G02B 6/2746 |

FOREIGN PATENT DOCUMENTS

| | | | |
|---|---|---|---|
| CN | 104079356 A | * | 10/2014 |
| CN | 104079356 A | | 10/2014 |
| JP | 2017167345 A | | 9/2017 |

OTHER PUBLICATIONS

Extended European Search Report issued Feb. 15, 2022 for EP Application No. 21188437.4, 8 pages.

* cited by examiner

*Primary Examiner* — Pranesh K Barua
(74) *Attorney, Agent, or Firm* — Schwabe, Williamson & Wyatt, P.C.

(57) ABSTRACT

Embodiments of the present disclosure are directed to an optical transceiver within a single device. The optical transceiver incorporates an optical isolator, thus eliminating the need for an external isolator unit. In embodiments, transmitter channels and receiver channels share a single lens array and incorporate a compensator block to equalize the transmitter and receiver optical signals in the transceiver. Other embodiments may be described and/or claimed.

18 Claims, 6 Drawing Sheets

OPTICAL TRANSCEIVER INTEGRATED CIRCUIT

TECHNICAL FIELD

Embodiments of the present disclosure generally relate to the field of photonic integrated circuits (PIC), in particular to optical transceiver integrated circuits (ICs).

BACKGROUND

Computing platforms are increasingly using photonic systems that use silicon as an optical medium. Today, these photonic systems, which may be implemented as a PIC, transmit and receive optical signals via separate integrated circuit units.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
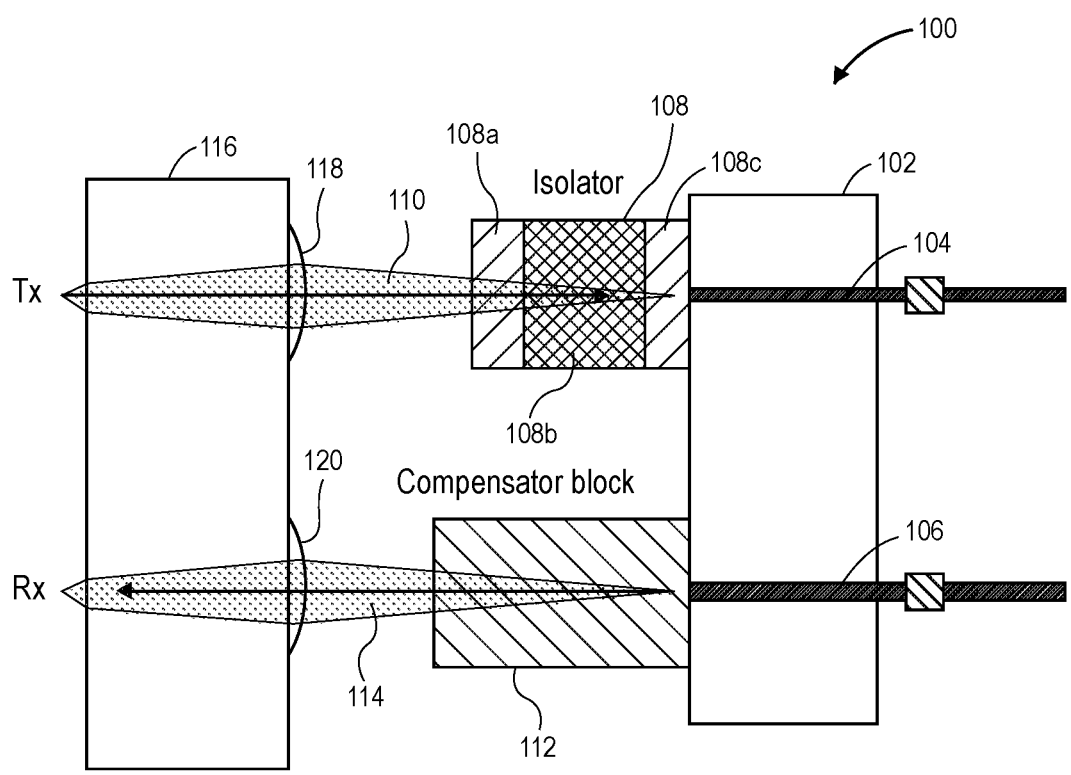
FIG. 1 is a top-down view of an optical transceiver IC that includes a lens array and a fiber block to which an optical isolator and a compensator block are attached, in accordance with various embodiments.

Embodiments described herein are directed to an optical transceiver IC having both the transmitter and receiver integrated on the same photonic integrated circuit (PIC). An optical transceiver IC may include a transmit optical subassembly (TOSA) that converts electrical signals into an optical signal, and a receiver optical subassembly (ROSA) that converts optical signals to an electrical signal. In embodiments described herein, the TOSA and ROSA are combined into a single unit that incorporates an optical isolator, thus eliminating the need for an external isolator unit. In embodiments, transmitter optical pathways (or transmitter channel) and receiver optical pathways (receiver channel) on the optical transceiver IC may share a single lens array, and incorporate a compensator block to equalize the transmitter and receiver optical pathways in the transceiver. These embodiments may reduce component and assembly costs, as well the overall footprint and energy requirements for implementing a TOSA and ROSA.

Legacy implementations require separate devices for TOSA and ROSA. In legacy implementations, the TOSA channels, or optical transmitter pathways, require an optical isolator to minimize the feedback to the laser source in order to maintain lazing stability. Typically, ROSA channels, or optical receiver pathways, do not require an optical isolator. In legacy implementations, the transmitter design is generally more challenging as it requires mode matching between the laser source/waveguide and an outgoing single mode fiber. These requirements may be somewhat relaxed for short range transmission multimode fibers. The receiver solutions are generally simpler and are based on coupling the light from a waveguide or a fiber to a photodiode, or an array of photodiodes.

These legacy implementations may require active alignment of the fiber block. The fiber block may be subject to stress imposed by fibers or shifts caused by epoxy curing or thermal expansion coefficient mismatch. This may affect coupling efficiency, reducing yield and increasing failure rate of components. In addition, these legacy designs require different optical design for optical transmitter pathways and optical receiver pathways, which may also be referred to as optical branches. This in turn necessitates manufacturing of two separate PICs and actively aligning both units. This significantly increases the cost and the footprint of the final implementation. Legacy waveguide butt-coupling solutions can be combined into a single unit, however there is a separate external optical isolator required for each transmit channel, for example an in-line optical isolator. This approach may be cost prohibitive in high-volume. In addition, legacy butt-coupled solutions typically only work with low numerical aperture (NA) waveguides that have reasonably large alignment tolerances so that a lens for mode-matching may be eliminated.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 is a top-down view of an optical transceiver IC that includes a lens array and a fiber block to which an optical isolator and a compensator block are attached, in accordance with various embodiments. Transceiver IC 100 includes a lens array 116 and a fiber block 102. The transceiver IC 100 allows the transmission of a transmitter optical signal 110 from the lens array 116 through a waveguide 104 of fiber block 102, as well as the reception of a receiver optical signal 114 from the waveguide 106 of fiber block 102 by the optical array 116.

The transmission of the transmitter optical signal 110 will pass through a focus lens 118, and will pass through an optical isolator 108 as the signal enters fiber 104 of fiber block 102. The optical isolator 108 is coupled, optically and/or physically, with the fiber block 102 and intersects transmitter optical signal 110. In embodiments, the optical isolator 108 is an optical component that allows transmission of light in one direction, and may be used to prevent unwanted optical feedback. In embodiments, the optical isolator 108 may be a Faraday rotator that includes an input polarizer 108a, which may also be referred to as a 0° polarizer, a Faraday rotator 108b, and an analyzer 108c, which may also be referred to as a 45° polarizer. The 0° polarizer 108a is aligned with innate polarization of the laser source, typically a transverse electric (TE) mode, and passes the incoming light with little attenuation. The Faraday rotator 108b rotates the incoming light polarization by 45°, so it freely passes the 45° polarizer 108c. The optical isolator 108 blocks light of any polarization coming from the side of the 45° polarizer 108c by first polarizing it at 45° and then rotating the light polarization by additional 45° to the total of 90° so it is cut by the 0° polarizer 108a.

The reception of the receiver optical signal 114 will pass through a compensator block 112 on its way to focus lens 120 of the lens array 116. In embodiments, the compensator block 112 includes a thickness of glass material, or of other transparent materials discussed below. The compensator block 112 is to equalize the transmitter optical signal 110 in the receiver optical signal 114 between the lens array 116 and the fiber block 102. Without the compensator block 112, the transmitter optical signal 110 and the receiver optical signal 114 would focus at different locations. This equalization allows the transmission and reception functions to be merged into one common focusing lens array 116 and fiber block 102. In embodiments, the dimensions of the optical isolator 108 and the compensator block 112 may be adjusted depending upon the distance and/or positions of the focusing lens array 116 and the fiber block 102.

In embodiments, both optical isolator 108 and compensator block 112 are of similar total thickness. To achieve this, in embodiments, the index of refraction of the compensator block 112 should be between the indices of refraction of the polarizer layers 108a, 108c, for example approximately 1.5, and that of the Faraday rotator 108b. In embodiments, the Faraday rotator 108b may be made of Yttrium Iron Garnet, with an index of refraction of approximately 2.3. In embodiments, heavy Flint glasses such as SF-11, which may have an example index of refraction of 1.8, or Lanthanum Crown glasses may be used for the compensator block 112. Other materials may include other high index glasses or crystalline materials such as Sapphire or Silicon Nitride.

Figure 2:
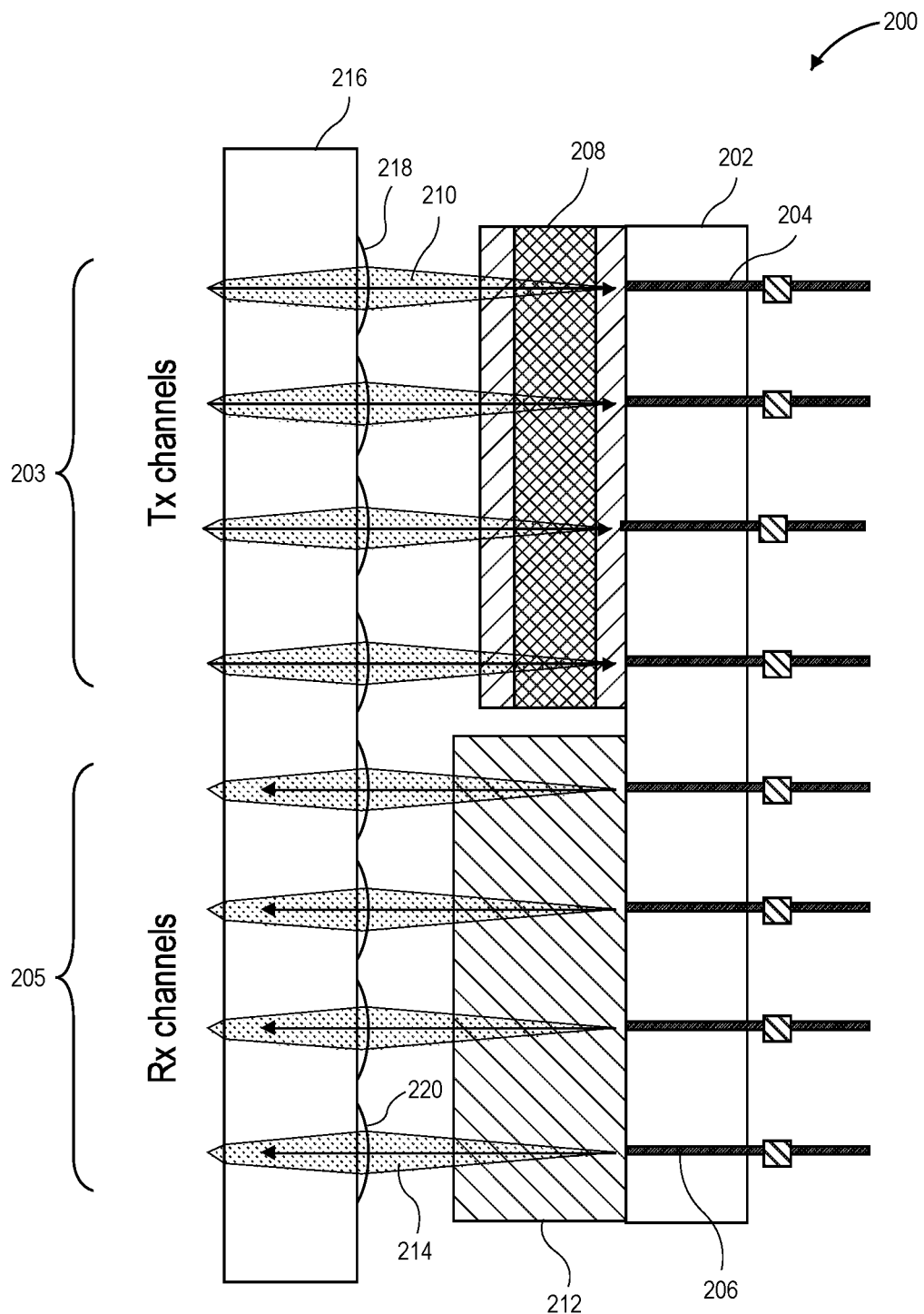
FIG. 2 is a top-down view of an optical transceiver IC that includes a lens array and a fiber block that supports multiple transmit and receive optical pathways to which an optical isolator and a compensator block are attached, in accordance with various embodiments.

FIG. 2 is a top-down view of an optical transceiver IC that includes a lens array and a fiber block that supports multiple transmit and receive optical pathways to which an optical isolator and a compensator block are attached, in accordance with various embodiments. Transceiver IC 200 shows a lens array 216 and a fiber block 202, which may be similar to lens array 116 and fiber block 102 of FIG. 1. Transceiver IC 200 has a number of transmit channels 203 that may include a number of transmitter optical signals 210. Transceiver IC 200 may also include a number of receive channels 205 that may include a number of receiver optical signals 214. Both transmission and reception use the same lens array 216 and fiber block 202.

As shown, each of the transmitter optical signals 210, which may be similar to transmitter optical signals 110 of FIG. 1, of the transmit channels 203 pass through a lens 218, which may be similar to lens 118 of FIG. 1 and into a common optical isolator 208, which may be similar to optical isolator 108 of FIG. 1. The transmitter optical signals 210 then focus into the fibers 204 of the transmit channels 203. In embodiments, the optical isolator 208 may be broken up into individual optical isolators (not shown) for use by one or more subsets of the transmitter optical signals 210.

Each of the receiver optical signals 214, which may be similar to receiver optical signals 114 of FIG. 1, of the receive channels 205 pass from a waveguide 206, which may be similar to waveguide 106 of FIG. 1, through a common compensator block 212, which may be similar to compensator block 112 of FIG. 1. The receiver optical signals 214 then pass through a receiver lens 220 of the receiver channels 205 of the focusing lens array 216. In embodiments, the compensator block 212 may be broken into individual compensator blocks (not shown) for use—

It should be appreciated that although the lenses 218, 220 of the lens array 216 are shown in a line, in other embodiments the lenses 218, 220 may appear as a two-dimensional array on the lens array 216. Similarly, the corresponding waveguides 204, 206 may appear as a two dimensional array on the fiber block 202.

Figure 3:
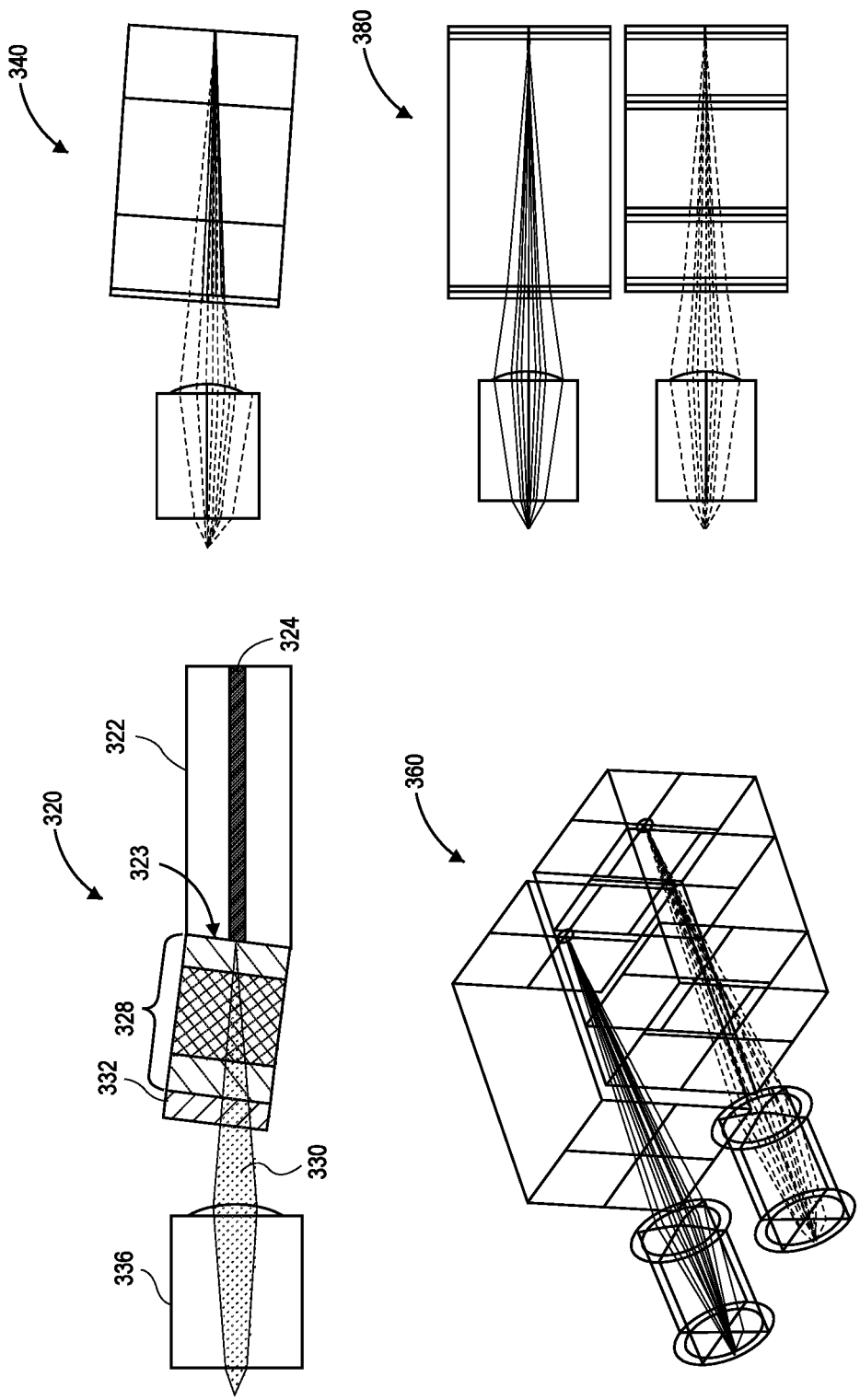
FIG. 3 shows top, side, and perspective views of optical isolators and compensator blocks interacting with optical pathways, in accordance with various embodiments.

FIG. 3 shows top, side, and perspective views of optical isolators and compensator blocks interacting with optical pathways, in accordance with various embodiments. FIG. 3 shows various examples related to optical transceiver IC 100 of FIG. 1. Diagram 330 shows a side view of optical transceiver IC 100, with lens array 336, optical isolator 328, compensator block 332 (positioned behind and partially obscured by optical isolator 328), fiber block 322, and waveguide 324, which may be similar to lens array 116, optical isolator 108, compensator block 112, fiber block 102, and waveguide 104 of FIG. 1.

As shown, a face 323 of the fiber block 322 is angled and is not perpendicular with respect to the waveguide 324 within the fiber block 322. In embodiments, the face 323 is polished at an angle to mitigate back reflection. In other embodiments, a similar angle affect may be achieved using an angled slab of any transparent material (not shown) coupled with a perpendicular face (not shown) of the fiber block 322 to cause the angle of the optical isolator 328 and the compensator block 332. However, an angled slab of transparent material (not shown) may cause a shift of a chief ray of the transmitter optical signal 330, and its resulting focus. In embodiments, the thickness of the compensator block 332 should be such that the chief rays, e.g. the chief rays of the transmitter optical path 110 and the receiver optical path 114 of FIG. 1, would focus at a same height and at a same distance from their respective focus lenses, for example lens 118 and lens 120 of FIG. 1. In embodiments, the angle of the face 323 off of the perpendicular of the waveguide 324 may be adjusted to produce better results.

In embodiments, thickness variations of the isolator 328 and/or compensator block 332 may cause vertical displacement of the focal spots, and coupling loss in one of the transmitter or receiver optical signal 330. In these embodiments, a small-angled role correction of a lens, for example in lens 218, 220 of FIG. 2, or a small-angled role correction of the fiber block 322 may be used to compensate for these variations.

Diagram 340 shows a side view of diagram 320, in a wireframe form without the fiber block 322. Diagram 360 shows a perspective view of diagram 320 in a wireframe form without the fiber block 322. Diagram 380 show a top-down view of diagram 320 in a wireframe form without the fiber block 322. In embodiments, the fiber polish angle may differ for the Tx and Rx paths. For cost reduction, the fiber polish angle can be the same for both paths. In embodiments, the fiber block is polished first, then the optical isolator and the compensator are cemented to it. In embodiments, an additional lens surface in 336 at opposite side of 118 and 120 of FIG. 1 for either Tx or Rx may be used to achieve the effect of optical path "equalization."

Figure 4:
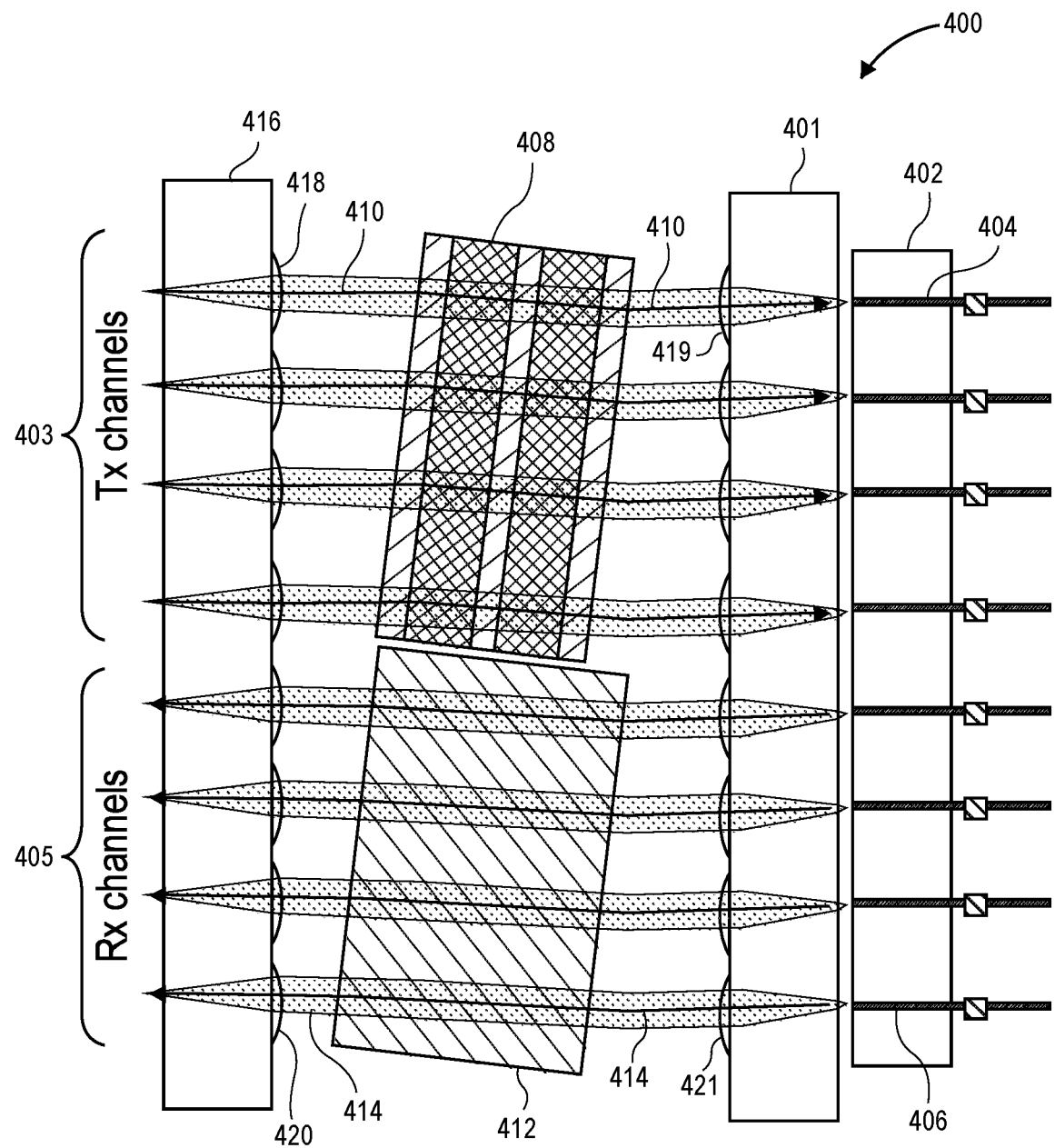
FIG. 4 is a top-down view of an optical transceiver IC that includes two lens arrays and a fiber block, with an optical isolator and compensator block between the two lens arrays, in accordance with various embodiments.

FIG. 4 is a top-down view of an optical transceiver IC that includes two lens arrays and a fiber block, with an optical isolator and compensator block between the two lens arrays, in accordance with various embodiments. Transceiver IC 400 includes a first lens array 416, which may be similar to lens array 216 of FIG. 2, with transmit channels 403 and receive channels 405, which may be similar to the transmit channels 203 and transmit channels 205 of FIG. 2. Transmit channels 403 include transmitter optical signals 410, which may be similar to transmitter optical signals 210 of FIG. 2. Receive channels 405 include receiver optical signals 414, which may be similar to receiver optical signals 214 of FIG. 2 Transceiver IC 400 also includes the fiber block 402, which may be similar to fiber block 202 of FIG. 2, that is optically coupled with a second lens array 401, the may be similar to lens array 216 of FIG. 2.

Transceiver IC 400 also includes a dual-stage isolator 408 that is positioned between the first lens array 416 and the second lens array 401 that intercepts the transmit optical paths 410 as they travel from lens 418 to lens 419 and into fiber 404, which may be similar to waveguide 204 of FIG. 2. In embodiments, the dual-stage isolator 408 may be a single-stage isolator, or another optical isolator with a different design.

Transceiver IC 400 also includes a compensator block 412 that is positioned between the first lens array 416 and the second lens array 401 that intercepts the receiver optical signal 414 from receive waveguide 406 of fiber block 402 through focus lens 421 of the second optical array 401 to the focus lens 420 of the first optical array 416. In embodiments, the compensator block 412 may be made of one or more layers of transparent material as described above.

In embodiments, the dual-stage isolator 408 or the compensator block 412 may not be physically coupled to the first lens array 416, the second lens array 401, or the fiber block 402. In embodiments, the dual-stage isolator 408 or the compensator block 412 may not be positioned parallel to the first optical array 416 or the second optical array 401, and may be tilted in either a horizontal plane (as shown) or vertical plane. In embodiments, the dual-stage isolator 408 and the compensator block 412 may be oriented in different directions. In other embodiments, the dual-stage isolator 408 and the compensator block 412 may be surrounded by air, and/or may be physically coupled with a substrate to maintain their orientation within the transceiver IC 400.

In other embodiments of a multi-channel implementation there may be a different number of transmit channels 403 and receive channels 405. In other embodiments, the positioning of the transmit channels 403 and the receive channels 405 may be unequally spaced, or may be staggered throughout the first optical array 416. In some embodiments, some transmit channels 403 may not require isolation, and may pass through the compensator block 412. In embodiments, the lenses 418, 419, 420, 421 may be single-lens designs, or dual-lens designs, or a combination of both. In embodiments, dual-lens design may allow light traveling in the path of the transmitter optical signal 410 and the path of the receiver optical signal 414 to be brought near to collimation by the first set of lenses, passing through the compensator block 412 or optical isolator 408 and then focused back, for example, on the fiber block 402. In embodiments, the transceiver IC 400 may be coupled with an optical module that has an electrical interface and an optical interface.

Figure 5:
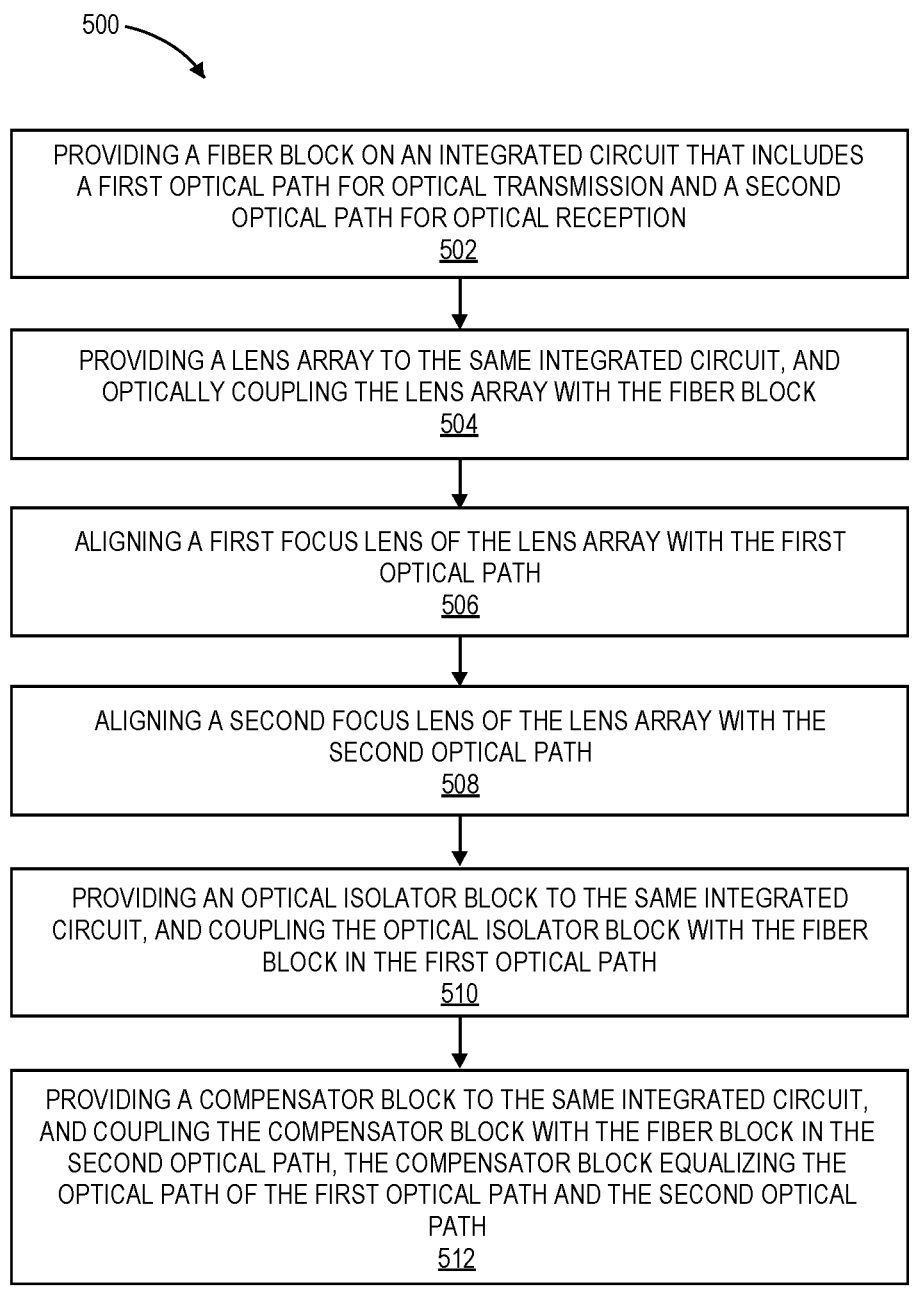
FIG. 5 is a process for creating a portion of an optical transceiver IC with an isolator and compensator unit, in accordance with various embodiments.

FIG. 5 is a process for creating a portion of an optical transceiver IC with an isolator and compensator unit, in accordance with various embodiments. Process 500 may be implemented using the various techniques and apparatuses described herein, in particular with respect to FIGS. 1-4.

At block 502, the process includes providing a fiber block on an integrated circuit that includes a first optical path for optical transmission and a second optical path for optical reception. The fiber block may include fiber block 102 of FIG. 1, fiber block 202 of FIG. 2, fiber block 322 of FIG. 3, or fiber block 402 of FIG. 4. The first optical path for transmission may include optical path 110 of FIG. 1, optical path 210 of FIG. 2, and/or optical path 410 of FIG. 4. The second optical path for optical reception may include optical path 114 of FIG. 1, optical path 214 of FIG. 2, and/or optical path 414 of FIG. 4.

At block 504, the process may include providing a lens array to the same integrated circuit, and optically coupling the lens array with the fiber block. The lens array and fiber block may include lens array 116 and fiber block 102 of FIG. 1, lens array 216 and fiber block 202 of FIG. 2, lens array 336 and fiber block 322 of FIG. 3, and first lens array 416 and/or second lens array 401 and fiber block 402 of FIG. 4.

At block 506, the process may include aligning a first focus lens of the lens array with the first optical path. In embodiments, this may represent a transmission channel. The first focus lens and the first optical path may include lens 118 and optical path 110 of FIG. 1, lens 218 and optical path 210 of FIG. 2, or lens 418 and optical path 410 of FIG. 4.

At block 508, the process may include aligning a second focus lens of the lens array with the second optical path. In embodiments, this may represent a receive channel. The second focus lens and the second optical path may include lens 120 and optical path 114 of FIG. 1, lens 220 and optical path 214 of FIG. 2, and/or lens 420 and optical path 414 of FIG. 4.

At block 510, the process may include providing an optical isolator block to the same integrated circuit, and coupling the optical isolator block with the fiber block in the first optical path. In embodiments, the optical isolator block and the fiber block may include isolator block 108 and fiber block 102 of FIG. 1, optical isolator block 208 and fiber block 202 of FIG. 2, or dual-isolator block 408 and fiber block 402 of FIG. 4.

At block 512, the process may include providing a compensator block to the same integrated circuit, and coupling the compensator block with the fiber block in the second optical path, the compensator block equalizing the optical path of the first optical path and the second optical path. In embodiments, the compensator block and the fiber block may include compensator block 112 and fiber block 102 of FIG. 1, compensator block 212 and fiber block 202 of FIG. 2, or compensator block 412 and fiber block 402 of FIG. 4.

It should be appreciated that any of the blocks above representing stages in the process 500 may be performed in any order, with one or more blocks being omitted or with one or more blocks being repeated.

Figure 6:
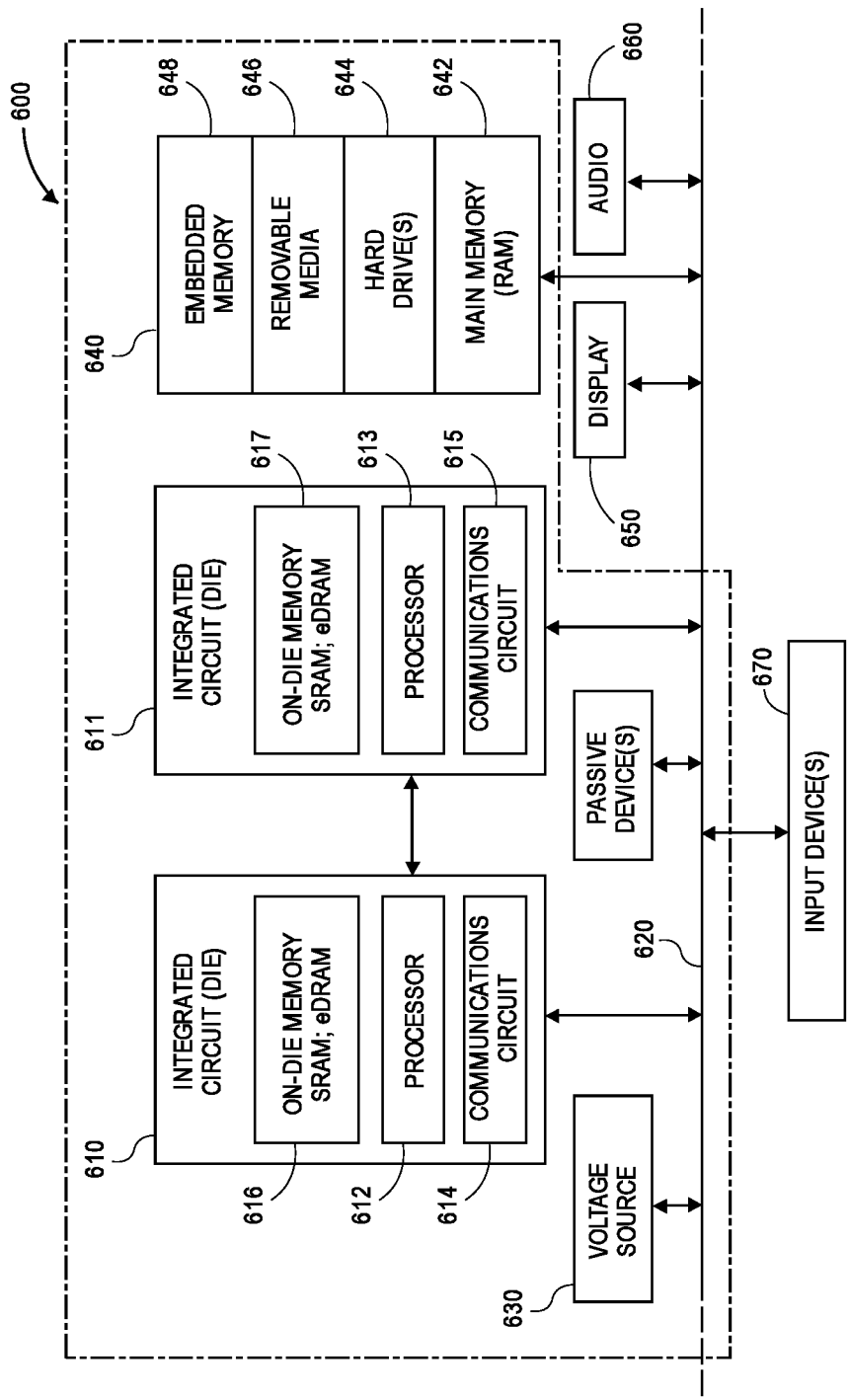
FIG. 6 schematically illustrates a computing device 600 in accordance with one embodiment.

Embodiments of the present disclosure may be implemented into a system using any suitable hardware and/or software to configure as desired. FIG. 6 schematically illustrates a computing device 600 in accordance with one embodiment. The computer system 600 (also referred to as the electronic system 600) as depicted can embody an optical transceiver IC with an isolator and compensator unit, according to any of the several disclosed embodiments and their equivalents as set forth in this disclosure. In particular, one or more of the communication circuits 614, 615 may embody an optical transceiver IC with an isolator and compensator unit. The computer system 600 may be a mobile device such as a netbook computer. The computer system 600 may be a mobile device such as a wireless smart phone. The computer system 600 may be a desktop computer. The computer system 600 may be a hand-held reader. The computer system 600 may be a server system. The computer system 600 may be a supercomputer or high-performance computing system.

In an embodiment, the electronic system 600 is a computer system that includes a system bus 620 to electrically couple the various components of the electronic system 600. The system bus 620 is a single bus or any combination of busses according to various embodiments. The electronic system 600 includes a voltage source 630 that provides power to the integrated circuit 610. In some embodiments, the voltage source 630 supplies current to the integrated circuit 610 through the system bus 620.

The integrated circuit 610 is electrically coupled to the system bus 620 and includes any circuit, or combination of circuits according to an embodiment. In an embodiment, the integrated circuit 610 includes a processor 612 that can be of any type. As used herein, the processor 612 may mean any type of circuit such as, but not limited to, a microprocessor, a microcontroller, a graphics processor, a digital signal processor, or another processor. In an embodiment, the processor 612 includes, or is coupled with, an optical transceiver IC with an isolator and compensator unit, as disclosed herein. In an embodiment, SRAM embodiments are found in memory caches of the processor. Other types of circuits that can be included in the integrated circuit 610 are a custom circuit or an application-specific integrated circuit (ASIC), such as a communications circuit 614 for use in wireless devices such as cellular telephones, smart phones, pagers, portable computers, two-way radios, and similar electronic systems, or a communications circuit for servers. In an embodiment, the integrated circuit 610 includes on-die memory 616 such as static random-access memory (SRAM). In an embodiment, the integrated circuit 610 includes embedded on-die memory 616 such as embedded dynamic random-access memory (eDRAM).

In an embodiment, the integrated circuit 610 is complemented with a subsequent integrated circuit 611. Useful embodiments include a dual processor 613 and a dual communications circuit 615 and dual on-die memory 617 such as SRAM. In an embodiment, the dual integrated circuit 610 includes embedded on-die memory 617 such as eDRAM.

In an embodiment, the electronic system 600 also includes an external memory 640 that in turn may include one or more memory elements suitable to the particular application, such as a main memory 642 in the form of RAM, one or more hard drives 644, and/or one or more drives that handle removable media 646, such as diskettes, compact disks (CDs), digital variable disks (DVDs), flash memory drives, and other removable media known in the art. The external memory 640 may also be embedded memory 648 such as the first die in a die stack, according to an embodiment.

In an embodiment, the electronic system 600 also includes a display device 650, an audio output 660. In an embodiment, the electronic system 600 includes an input device such as a controller 670 that may be a keyboard, mouse, trackball, game controller, microphone, voice-recognition device, or any other input device that inputs information into the electronic system 600. In an embodiment, an input device 670 is a camera. In an embodiment, an input device 670 is a digital sound recorder. In an embodiment, an input device 670 is a camera and a digital sound recorder.

As shown herein, the integrated circuit 610 can be implemented in a number of different embodiments, including a package having an optical transceiver IC with an isolator and compensator unit, according to any of the several disclosed embodiments and their equivalents, an electronic system, a computer system, one or more methods of fabricating an integrated circuit, and one or more methods of fabricating an electronic assembly that includes an optical transceiver with an isolator and compensator unit, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed optical transceivers with an isolator and compensator unit and their equivalents. A foundation multi-layer PCB may be included, as represented by the dashed line of FIG. 6. Passive devices may also be included, as is also depicted in FIG. 6.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Some non-limiting examples are provided below.

EXAMPLES

Example 1 is a photonic transceiver apparatus comprising: a fiber block disposed on an integrated circuit that includes a first optical path for optical transmission and a second optical path for optical reception; a lens array disposed on the same integrated circuit, and optically coupled with the fiber block, the lens array including a first focus lens and a second focus lens aligned, respectively, with the first optical path and the second optical path; an optical isolator block coupled with the fiber block and disposed between the fiber block and the lens array in the first optical path on the same integrated circuit, wherein the optical isolator block is to reduce the feedback to a laser source during optical transmission; and a compensator block coupled with the fiber block and disposed between the fiber block and the lens array in the second optical path on the same integrated circuit, wherein the compensator block is to equalize the optical path of the first optical path and the second optical path.

Example 2 may include the apparatus of example 1, wherein to equalize the optical path further includes to cause a first beam of light of the first optical path and a second beam of light of the second optical path to focus at a same height and at a same distance from their respective focus lenses.

Example 3 may include the apparatus of example 1, wherein the first and the second optical path extend, respectively, through the fiber block from a first side of the fiber block to a second side of the fiber block opposite the first side.

Example 4 may include the apparatus of example 3, wherein the lens array has a first side and a second side opposite the first side, wherein the second side of the fiber block faces and is substantially parallel to the first side of the lens array.

Example 5 may include the apparatus of example 1, wherein a face of the optical isolator block or a face of the compensator block is not perpendicular, respectively, to the first optical path or the second optical path to prevent light from being reflected back into a waveguide.

Example 6 may include the apparatus of example 5, wherein the face of the optical isolator block or the compensator block is tilted between 3 and 8 degrees from perpendicular to the first optical path or the second optical path.

Example 7 may include the apparatus of any one of examples 1-6, wherein the compensator block is a glass block.

Example 8 may include the apparatus of example 1, wherein the optical isolator block or the compensator block include an extra optical layer to adjust the focus of the first optical path or the second optical path.

Example 9 may include the apparatus of example 1, wherein the first optical path of the fiber block further includes a plurality of first optical paths of the fiber block for optical transmission and the second optical path of the fiber block further includes a plurality of second optical paths of the fiber block for optical reception; wherein the first focus lens includes a plurality of first focus lenses that are aligned, respectively, with the plurality of first optical paths of the fiber block and wherein the second focus lens includes a plurality of second focus lenses that are aligned, respectively, with a plurality of second optical paths of the fiber block; wherein the optical isolator block covers the plurality of the first optical paths, and wherein the compensator block covers the plurality of the second optical paths.

Example 10 may include the apparatus of example 1, wherein the optical isolator is a single stage optical isolator.

Example 11 may be a method for creating a photonic transceiver apparatus, the method comprising: providing a fiber block on an integrated circuit that includes a first optical path for optical transmission and a second optical path for optical reception; providing a lens array to the same integrated circuit, and optically coupling the lens array with the fiber block; aligning a first focus lens of the lens array with the first optical path; aligning a second focus lens of the lens array with the second optical path; providing an optical isolator block to the same integrated circuit, and coupling the optical isolator block with the fiber block in the first optical path; and providing a compensator block to the same integrated circuit, and coupling the compensator block with the fiber block in the second optical path, the compensator block equalizing the optical path of the first optical path and the second optical path.

Example 12 may include the method of example 11, wherein equalizing the optical path further includes causing a first beam of light of the first optical path and a second beam of light of the second optical path to focus at a same height and at a same distance from their respective focus lenses.

Example 13 may include the method of example 11, wherein providing the compensator block comprises providing a glass block.

Example 14 may include the method of example 11, wherein coupling the isolator block with the fiber block in the first optical path further includes aligning a face of the isolator block so that it is not perpendicular to the first optical path.

Example 15 may include the method of any one of examples 11-14, wherein coupling the compensator block with the fiber block in the second optical path further includes aligning a face of the compensator block so that it is not perpendicular to the second optical path.

Example 16 is a system comprising: an optical module having an electrical interface and an optical interface; and a photonic transceiver integrated circuit coupled with the optical interface of the optical module, the photonic transceiver integrated circuit comprising: a fiber block disposed on the integrated circuit that includes a first optical path for optical transmission and a second optical path for optical reception; a lens array disposed on the same integrated circuit and optically coupled with the fiber block; the lens array including a first focus lens and a second focus lens aligned, respectively, with the first optical path and the second optical path; an optical isolator block disposed on the same integrated circuit and coupled with the fiber block and disposed between the fiber block and the lens array in the first optical path, wherein the optical isolator block is to reduce the feedback to a laser source during optical transmission; and a compensator block disposed on the same integrated circuit and coupled with the fiber block and disposed between the fiber block and the lens array in the second optical path, wherein the compensator block is to cause a first beam of light of the first optical path and a second beam of light of the second optical path to focus at a same height and at a same distance from their respective focus lenses.

Example 17 may include the system of example 16, wherein the compensator block is a glass block.

Example 18 may include the system of example 16, wherein the first and the second optical path extend, respectively, through the fiber block from a first side of the fiber block to a second side of the fiber block opposite the first side.

Example 19 may include the system of example 18, wherein the lens array has a first side and a second side opposite the first side, wherein the second side of the fiber block faces and is substantially parallel to the first side of the lens array.

Example 20 may include the system of any one of example 16-19, wherein a face of the optical isolator block or a face of the compensator block is tilted between 3 and 8 degrees from perpendicular to the first optical path or the second optical path.

We claim:

1. A photonic transceiver apparatus comprising:
   a fiber block disposed on an integrated circuit that includes a first optical path for optical transmission and a second optical path for optical reception;
   a lens array disposed on the same integrated circuit, and optically coupled with the fiber block, the lens array including a first focus lens and a second focus lens aligned, respectively, with the first optical path and the second optical path;
   an optical isolator block coupled with the fiber block and disposed between the fiber block and the lens array in the first optical path on the same integrated circuit, wherein the optical isolator block is to reduce the feedback to a laser source during optical transmission; and
   a compensator block coupled with the fiber block and disposed between the fiber block and the lens array in the second optical path on the same integrated circuit, wherein the compensator block is to equalize the optical path of the first optical path and the second optical path;
   wherein a face of the optical isolator block and a face of the compensator block are parallel to one another, wherein the face of the optical isolator block is a face through which the first optical path passes and the face of the compensator block is a face through which the second optical path passes;
   wherein the face of the optical isolator block is not perpendicular to the first optical path; and
   wherein the face of the compensator block is not perpendicular to the second optical path.

2. The apparatus of claim 1, wherein to equalize the optical path further includes to cause a first beam of light of the first optical path and a second beam of light of the second optical path to focus at a same height and at a same distance from their respective focus lenses.

3. The apparatus of claim 1, wherein the first and the second optical path respectively include first and second waveguides that extend through the fiber block from a first side of the fiber block to a second side of the fiber block opposite the first side.

4. The apparatus of claim 3, wherein the lens array has a first side and a second side opposite the first side, wherein the second side of the fiber block faces and is parallel to the first side of the lens array.

5. The apparatus of claim 1, wherein the face of the optical isolator block and the face of the compensator block are tilted between 3 and 8 degrees from perpendicular to the first optical path and or the second optical path, respectively.

6. The apparatus of claim 1, wherein the compensator block is a glass block.

7. The apparatus of claim 1, wherein the first optical path of the fiber block further includes a plurality of first optical paths of the fiber block for optical transmission and the second optical path of the fiber block further includes a plurality of second optical paths of the fiber block for optical reception;
   wherein the first focus lens includes a plurality of first focus lenses that are aligned, respectively, with the plurality of first optical paths of the fiber block, and wherein the second focus lens includes a plurality of second focus lenses that are aligned, respectively, with a plurality of second optical paths of the fiber block;
   wherein the optical isolator block is in the plurality of the first optical paths, and wherein the compensator block is in the plurality of the second optical paths.

8. The apparatus of claim 1, wherein the optical isolator is a single stage optical isolator.

9. A method for creating a photonic transceiver apparatus, the method comprising:
   providing a fiber block on an integrated circuit that includes a first optical path for optical transmission and a second optical path for optical reception;
   providing a lens array to the same integrated circuit, and optically coupling the lens array with the fiber block;
   aligning a first focus lens of the lens array with the first optical path;
   aligning a second focus lens of the lens array with the second optical path;
   providing an optical isolator block to the same integrated circuit, and coupling the optical isolator block with the fiber block in the first optical path;
   providing a compensator block to the same integrated circuit, and coupling the compensator block with the fiber block in the second optical path, the compensator block equalizing the optical path of the first optical path and the second optical path;,
   wherein a face of the optical isolator block and a face of the compensator block are parallel to one another, wherein the face of the optical isolator block is a face through which the first optical path passes and the face of the compensator block is a face through which the second optical path passes;
   wherein the face of the optical isolator block is not perpendicular to a face of the fiber block through which the first and second optical paths pass; and
   wherein the face of the compensator block is not perpendicular to the face of the fiber block.

10. The method of claim 9, wherein equalizing the optical path further includes causing a first beam of light of the first optical path and a second beam of light of the second optical path to focus at a same height and at a same distance from their respective focus lenses.

11. The method of claim 9, wherein providing the compensator block comprises providing a glass block.

12. The method of claim 9, wherein the face of the isolator block is not perpendicular to the first optical path.

13. The method of claim 12, wherein the face of the compensator block is not perpendicular to the second optical path.

14. A system comprising:
an optical module having an electrical interface and an optical interface; and
a photonic transceiver integrated circuit coupled with the optical interface of the optical module, the photonic transceiver integrated circuit comprising:
 a fiber block disposed on the integrated circuit that includes a first optical path for optical transmission and a second optical path for optical reception;
 a lens array disposed on the same integrated circuit and optically coupled with the fiber block, the lens array including a first focus lens and a second focus lens aligned, respectively, with the first optical path and the second optical path;
 an optical isolator block disposed on the same integrated circuit and coupled with the fiber block, and disposed between the fiber block and the lens array in the first optical path, wherein the optical isolator block is to reduce the feedback to a laser source during optical transmission; and
 a compensator block disposed on the same integrated circuit and coupled with the fiber block and disposed between the fiber block and the lens array in the second optical path, wherein the compensator block is to cause a first beam of light of the first optical path and a second beam of light of the second optical path to focus at a same height and at a same distance from their respective focus lenses;
 wherein a face of the optical isolator block and a face of the compensator block are parallel to one another, wherein the face of the optical isolator block is a face through which the first optical path passes and the face of the compensator block is a face through which the second optical path passes;
 wherein the face of the optical isolator block is not perpendicular to a face of the fiber block through which the first and second optical paths pass;
 wherein the face of the optical isolator block is not perpendicular to the first optical path;
 wherein the face of the compensator block is not perpendicular to the face of the fiber block; and
 wherein the face of the compensator block is not perpendicular to the face of the fiber block.

15. The system of claim 14, wherein the compensator block is a glass block.

16. The system of claim 14, wherein the first and the second optical path respectively include first and second waveguides that extend through the fiber block from a first side of the fiber block to a second side of the fiber block opposite the first side.

17. The system of claim 16, wherein the lens array has a first side and a second side opposite the first side, wherein the second side of the fiber block faces and is parallel to the first side of the lens array.

18. The system of claim 14, wherein the a-face of the optical isolator block and the face of the compensator block is tilted between 3 and 8 degrees from perpendicular to the first optical path and the second optical path, respectively.

\* \* \* \* \*

UNITED STATES PATENT AND TRADEMARK OFFICE
CERTIFICATE OF CORRECTION

| | | |
|---|---|---|
| PATENT NO. | : 12,052,058 B2 | Page 1 of 1 |
| APPLICATION NO. | : 17/075372 | |
| DATED | : July 30, 2024 | |
| INVENTOR(S) | : Alexander Krichevsky and Boping Xie | |

It is certified that error appears in the above-identified patent and that said Letters Patent is hereby corrected as shown below:

In the Claims

Column 12
Line 18 "optical path and or the second optical path…" should read --optical path and the second optical path…--

Column 13
Line 34 "…coupled with the fiber block and disposed" should read --…coupled with the fiber block, and disposed…--

Column 14
Line 32 "…wherein the a-face of the" should read --…wherein the face of the--

Signed and Sealed this
Twentieth Day of May, 2025

Coke Morgan Stewart
*Acting Director of the United States Patent and Trademark Office*